United States Patent
Inoue

(10) Patent No.: US 10,812,683 B2
(45) Date of Patent: Oct. 20, 2020

(54) INFORMATION PROCESSING APPARATUS, INFORMATION PROCESSING SYSTEM, AND NON-TRANSITORY COMPUTER READABLE MEDIUM PROVIDING CONCEALED HISTORY INFORMATION IN ACCORDANCE WITH AUTHORIZATION OF A VIEWER

(71) Applicant: FUJI XEROX CO., LTD., Tokyo (JP)

(72) Inventor: Seiji Inoue, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/561,783

(22) Filed: Sep. 5, 2019

(65) Prior Publication Data

US 2020/0304685 A1 Sep. 24, 2020

(30) Foreign Application Priority Data

Mar. 20, 2019 (JP) .................................. 2019-053408

(51) Int. Cl.
*H04N 1/44* (2006.01)
*H04L 9/08* (2006.01)
*G06F 3/12* (2006.01)

(52) U.S. Cl.
CPC ......... *H04N 1/4446* (2013.01); *G06F 3/1203* (2013.01); *G06F 3/1273* (2013.01); *G06F 3/1285* (2013.01); *H04L 9/0816* (2013.01); *H04N 1/4433* (2013.01); *H04N 2201/0094* (2013.01); *H04N 2201/3202* (2013.01)

(58) Field of Classification Search
None
See application file for complete search history.

(56) References Cited

U.S. PATENT DOCUMENTS

| | | | |
|---|---|---|---|
| 2007/0061374 A1* | 3/2007 | Inakawa | G06K 15/00 |
| 2007/0067680 A1* | 3/2007 | Harada | G06F 21/608 |
| | | | 714/45 |
| 2007/0103715 A1* | 5/2007 | Nakata | G06F 3/1239 |
| | | | 358/1.14 |
| 2011/0002012 A1* | 1/2011 | Amagai | G06K 19/06046 |
| | | | 358/3.28 |
| 2014/0211240 A1* | 7/2014 | Maki | G06F 3/1222 |
| | | | 358/1.14 |
| 2015/0058249 A1* | 2/2015 | Akutsu | G06Q 10/06 |
| | | | 705/342 |
| 2018/0136884 A1* | 5/2018 | Ikari | G06F 21/608 |

FOREIGN PATENT DOCUMENTS

| | | |
|---|---|---|
| JP | 2004-199409 A | 7/2004 |
| JP | 2009-87160 A | 4/2009 |
| JP | 2017-21739 A | 1/2017 |

* cited by examiner

*Primary Examiner* — Miya J Williams
(74) *Attorney, Agent, or Firm* — Oliff PLC

(57) ABSTRACT

An information processing apparatus includes a reception unit, a generating unit, and a presenting unit. The reception unit acquires identification information used for identifying a user and receives a request for executing a job with respect to an apparatus to be used. The generating unit executes the job by using a function included in the apparatus and generates history information using the identification information and an execution result of the job. The presenting unit entirely or partially conceals the history information in accordance with authorization of a viewer and presents the concealed history information.

15 Claims, 11 Drawing Sheets

FIG. 6

| JOB ID | USER ID | APPLICATION | INPUT SOURCE | NUMBER OF INPUT SHEETS | OUTPUT DESTINATION | NUMBER OF OUTPUT SHEETS |
|---|---|---|---|---|---|---|
| 1 | fdjak | Copy | Scanner | 10 | Printer | 10 |
| 2 | yreui | CloudPrint | hdgdcmdkt | 20 | Printer | 20 |
| 3 | cbnci | ScanCloud | Scanner | 15 | yrgdbcjk | 15 |
| 4 | ejduw | Fax | Scanner | 3 | trfsbhk | 3 |
| 5 | clghg | ScanMail | Scanner | 8 | jdhandkt | 8 |
| 6 | aszkm | ScanMail | Scanner | 7 | mvndhru | 7 |

| APPARATUS ADDRESS | ENCRYPTION KEY | JOB ID | USER ID | APPLICATION | INPUT SOURCE | NUMBER OF INPUT SHEETS | OUTPUT DESTINATION | NUMBER OF OUTPUT SHEETS |
|---|---|---|---|---|---|---|---|---|
| 2.2.2.2 | njfahelkuh | 1 | hanako | Copy | Scanner | 10 | Printer | 10 |
| 2.2.2.2 | cjnaklhyuejn | | taro | | | | | |

FIG. 7B

| APPARATUS ADDRESS | ENCRYPTION KEY | JOB ID | USER ID | APPLICATION | INPUT SOURCE | NUMBER OF INPUT SHEETS | OUTPUT DESTINATION | NUMBER OF OUTPUT SHEETS |
|---|---|---|---|---|---|---|---|---|
| 2.2.2.2 | njfahelkuh | 1 | hanako | Copy | Scanner | 10 | Printer | 10 |
| 2.2.2.2 | cjnaklhyuejn | 2 | taro | CloudPrint | http://corporation-a.com/countermeasure-against-product-of-corporation-B.docx | 20 | Printer | 20 |
| 2.2.2.2 | cjnaklhyuejn | 3 | taro | ScanCloud | Scanner | 15 | http://corporation-a.com/client-list.xlsx | 15 |

FIG. 8

Table 31b:

| ENCRYPTION KEY | JOB ID | USER ID |
|---|---|---|
| njfahelkuh | 1 | hanako |
| cjnaklhyuejn | 2 | taro |
| cjnaklhyuejn | 3 | taro |

FIG. 9

Table 52A:

| JOB ID | USER ID | APPLICATION | INPUT SOURCE | NUMBER OF INPUT SHEETS | OUTPUT DESTINATION | NUMBER OF OUTPUT SHEETS |
|---|---|---|---|---|---|---|
| 1 | hanako | Copy | Scanner | 10 | Printer | 10 |
| 2 | taro | CloudPrint | http://corporation-a.com/countermeasure-against-product-of-corporation-B.docx | 20 | Printer | 20 |
| 3 | taro | ScanCloud | Scanner | 15 | http://corporation-a.com/client-list.xlsx | 15 |
| 4 | jiro | Fax | Scanner | 3 | 044-555-9663 | 3 |
| 5 | jiro | ScanMail | Scanner | 8 | jiro@corporation-b.com | 8 |
| 6 | taro | ScanMail | Scanner | 3 | taro@corporation-b.com | 7 |

| APPLICATION | INPUT SOURCE | AFTER CONCEALMENT |
|---|---|---|
| CloudPrint | http://corporation-a.com/countermeasure-against-product-of-corporation-B.docx | http://corporation-a.com/*************** |
| ScanCloud | http://corporation-a.com/client-list.xlsx | http://corporation-a.com/***** |
| Fax | 044-555-9663 | 044-*-** |
| ScanMail | taro@corporation-b.com | ****@corporation-b.com |

INFORMATION PROCESSING APPARATUS, INFORMATION PROCESSING SYSTEM, AND NON-TRANSITORY COMPUTER READABLE MEDIUM PROVIDING CONCEALED HISTORY INFORMATION IN ACCORDANCE WITH AUTHORIZATION OF A VIEWER

CROSS-REFERENCE TO RELATED APPLICATIONS

This application is based on and claims priority under 35 USC 119 from Japanese Patent Application No. 2019-053408 filed Mar. 20, 2019.

BACKGROUND (i) Technical Field

The present disclosure relates to information processing apparatuses, information processing systems, and non-transitory computer readable media.

(ii) Related Art

In recent years, there has been proposed a log aggregation system that performs an aggregation process for each user while not allowing user identification information included in a log to be referred to on a log aggregation server (e.g., see Japanese Unexamined Patent Application Publication No. 2009-87160).

The log aggregation system disclosed in Japanese Unexamined Patent Application Publication No. 2009-87160 includes an encrypted-log generating apparatus, a log aggregation apparatus, and a log utilization apparatus. The encrypted-log generating apparatus generates an encrypted log by acquiring a log indicating the contents of usage by users of an image processing apparatus and selectively encrypting user identification information (i.e., user names) included in the log (i.e., without changing the encryption method and the key used for the encryption within a predetermined period), and transmits the encrypted log. The log aggregation apparatus receives the encrypted log from the encrypted-log generating apparatus, aggregates the encrypted log for each piece of encrypted user identification information, and transmits the aggregation result of the encrypted log to the log utilization apparatus. The log utilization apparatus receives the aggregation result and decrypts the user identification information included in the aggregation result.

In a case where an apparatus, such as a multifunction apparatus, is shared in a shared space, such as a shared office, a rental office, or a co-working space, where organizations, such as multiple corporations, are active, there is a concern that information contained in job history information accumulated in the apparatus may undesirably be exposed to other users. On the other hand, entirely limiting the viewability of the accumulated job history information to a job executer has a negative effect in that the job history is not utilizable by the administrator of each organization and the administrator of the shared space.

SUMMARY

Aspects of non-limiting embodiments of the present disclosure relate to an information processing apparatus, an information processing system, and a non-transitory computer readable medium that are capable of concealing and presenting information that should be concealed in job history information in an unidentifiable manner in accordance with authorization of a viewer of the history information.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a reception unit, a generating unit, and a presenting unit. The reception unit acquires identification information used for identifying a user and receives a request for executing a job with respect to an apparatus to be used. The generating unit executes the job by using a function included in the apparatus and generates history information using the identification information and an execution result of the job. The presenting unit entirely or partially conceals the history information in accordance with authorization of a viewer and presents the concealed history information.

BRIEF DESCRIPTION OF THE DRAWINGS

An exemplary embodiment of the present disclosure will be described in detail based on the following figures, wherein:

FIG. 6 illustrates an example of encrypted job-history information after being encrypted;

FIG. 7A illustrates an example of an aggregation table;

FIG. 7B illustrates another example of the aggregation table;

FIG. 8 illustrates an example of an encryption key list;

FIG. 9 illustrates an example of organization-job-history information;

DETAILED DESCRIPTION

Figure 1:
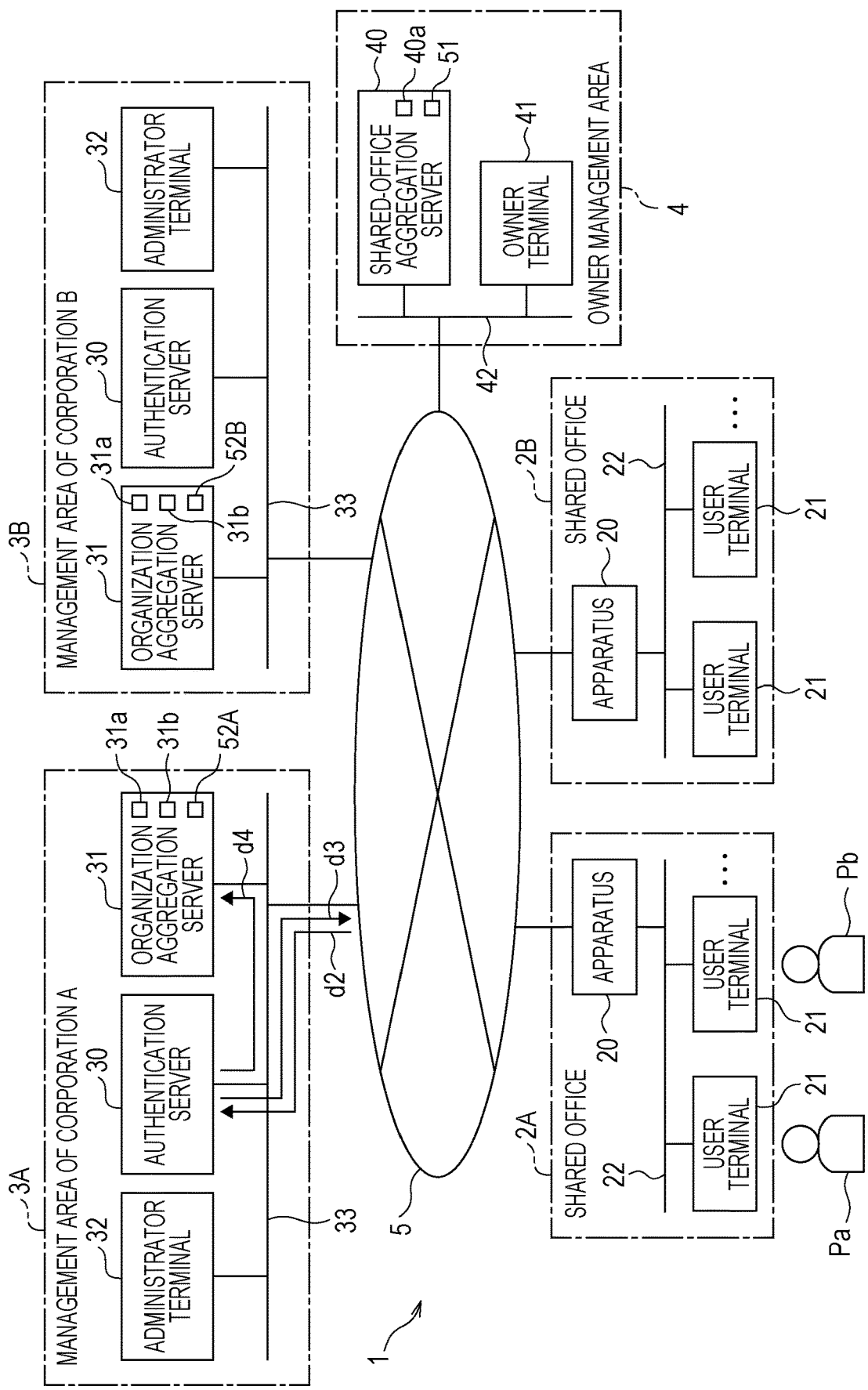
FIG. 1 illustrates a configuration example of an information processing system according to a first exemplary embodiment of the present disclosure.

An exemplary embodiment of the present disclosure will be described below with reference to the drawings. In the drawings, components having substantially identical functions are given the same reference sign, and redundant descriptions thereof are omitted.

General Outline of Exemplary Embodiment

An information processing system according to an exemplary embodiment includes an information processing apparatus, a first external apparatus, and a second external apparatus. The information processing apparatus includes a reception unit, a generating unit, and a presenting unit. The reception unit acquires identification information used for identifying a user and receives a request for executing a job with respect to an apparatus to be used. The generating unit executes the job by using a function included in the apparatus and generates history information using the identification information and an execution result of the job. The presenting unit entirely or partially conceals the history information in accordance with authorization of a viewer and presents the concealed history information. The first external apparatus is managed by a first administrator belonging to an organization to which the user belongs and receives, from the information processing apparatus, the partially-concealed history information with respect to a user belonging to the organization and the entirely-concealed history information with respect to a user belonging to another organization, the partially-concealed history information and the entirely-concealed history information being included in the history information. The second external apparatus is managed by a second administrator of an area in which the apparatus is disposed and receives the partially-concealed history information related to all organizations from the information processing apparatus.

The term "viewer" refers to a person viewing the usage condition of an apparatus and includes the following:

a. a first viewer related to an organization to which a user belongs;

b. a second viewer of an area in which the apparatus is disposed; and c. a user.

For example, the viewer may be given the following authorization.

a. Authorization that allows a first administrator to view unconcealed history information of users belonging to an organization that the first administrator belongs to or manages (in this case, the first administrator is not allowed to view history information of users belonging to other organizations).

b. Authorization that allows a second administrator to view information other than information that should be concealed in history information of users of all organizations.

c. Authorization that allows a user to view his/her own history information only, authorization that allows the user to view information other than the information that should be concealed in his/her own history information, or authorization that allows the user to view information other than the information that should be concealed in the history information related to users belonging to his/her own organization.

First Exemplary Embodiment

FIG. 1 illustrates a configuration example of an information processing system 1 according to a first exemplary embodiment of the present disclosure. The information processing system 1 includes: an apparatus 20 and multiple user terminals 21 disposed in each of multiple shared offices 2A and 2B (which may collectively be referred to as "shared offices 2" hereinafter); an authentication server 30, an organization aggregation server 31, and an administrator terminal 32 that are disposed in each of management areas 3A and 3B (which may collectively be referred to as "organization management areas 3" hereinafter) managed by organizations A and B to which users Pa and Pb using the shared offices 2 belong, respectively; and a shared-office aggregation server 40 and an owner terminal 41 that are disposed in an owner management area 4 managed by an owner of the shared offices 2.

Each apparatus 20 is an example of an information processing apparatus. Each authentication server 30 is an example of an external authentication apparatus. Each organization aggregation server 31 is an example of a first external apparatus. The shared-office aggregation server 40 is an example of a second external apparatus. An administrator of each organization aggregation server 31 is an example of a first administrator. The owner of the shared offices 2 is an example of a second administrator.

Although there are two shared offices 2 shown in FIG. 1, there may be a single shared office 2 or three or more shared offices 2. Moreover, although there are two organization management areas 3 shown in FIG. 1, there may be a single organization management area 3 or three or more organization management areas 3. Furthermore, although there is a single apparatus 20 used in each shared office 2, each shared office 2 may have two or more apparatuses of the same type or two or more apparatuses of different types.

The apparatus 20 and the user terminals 21 disposed in each shared office 2 are connected to one another by an internal network 22. The user Pa belonging to the organization A and the user Pb belonging to the organization B use the apparatus 20 disposed in the shared office 2 directly or via the corresponding user terminals 21. The apparatus 20 is normally owned by the owner of the shared offices 2. The apparatus 20 is used by a user belonging to an organization that has signed a contract with the owner of the shared offices 2.

The authentication server 30, the organization aggregation server 31, and the administrator terminal 32 disposed in each organization management area 3 are connected to one another by an internal network 33. The organization management area 3A is defined as a management area of the organization A, and the organization management area 3B is defined as a management area of the organization B. The administrator terminal 32 disposed in the organization management area 3A is used by the first administrator belonging to the organization A. The administrator terminal 32 disposed in the organization management area 3B is used by the second administrator belonging to the organization B. The first administrator (more specifically, for example, a staff member of a network management department or an accounting department) desires to acquire a job history and perform an aggregation and an analysis so as to seek a method for efficiently utilizing the resources of the organization.

The shared-office aggregation server 40 and the owner terminal 41 disposed in the owner management area 4 are connected to one another by an internal network 42. The owner of the shared offices 2 desires to acquire a job history of the apparatuses 20 and perform an aggregation and an analysis so as make the shared offices 2 attractive.

Each of the internal networks 22, 33, and 42 is a communication network, such as a local area network (LAN) or an intranet. The internal networks 22, 33, and 42 are connected to an external network 5. The external network 5 is a communication network, such as the Internet or a public network.

In this exemplary embodiment, each apparatus 20 is an image forming apparatus, such as a multifunction apparatus. A multifunction apparatus has multiple functions, such as a copying function, a scanning function, a printing function, a mail exchanging function, and a facsimile function. Each apparatus 20 may be an image forming apparatus having a single function, such as a printing function or a facsimile function, or may be an information processing apparatus, such as a personal computer (PC).

Each of the user terminals 21, the administrator terminals 32, and the owner terminal 41 is a terminal apparatus, such as a PC. A terminal apparatus may be a portable information processing terminal, such as a notebook personal computer, or a mobile communication terminal, such as a multifunction portable telephone (smartphone).

Configuration of Apparatus

Figure 2:
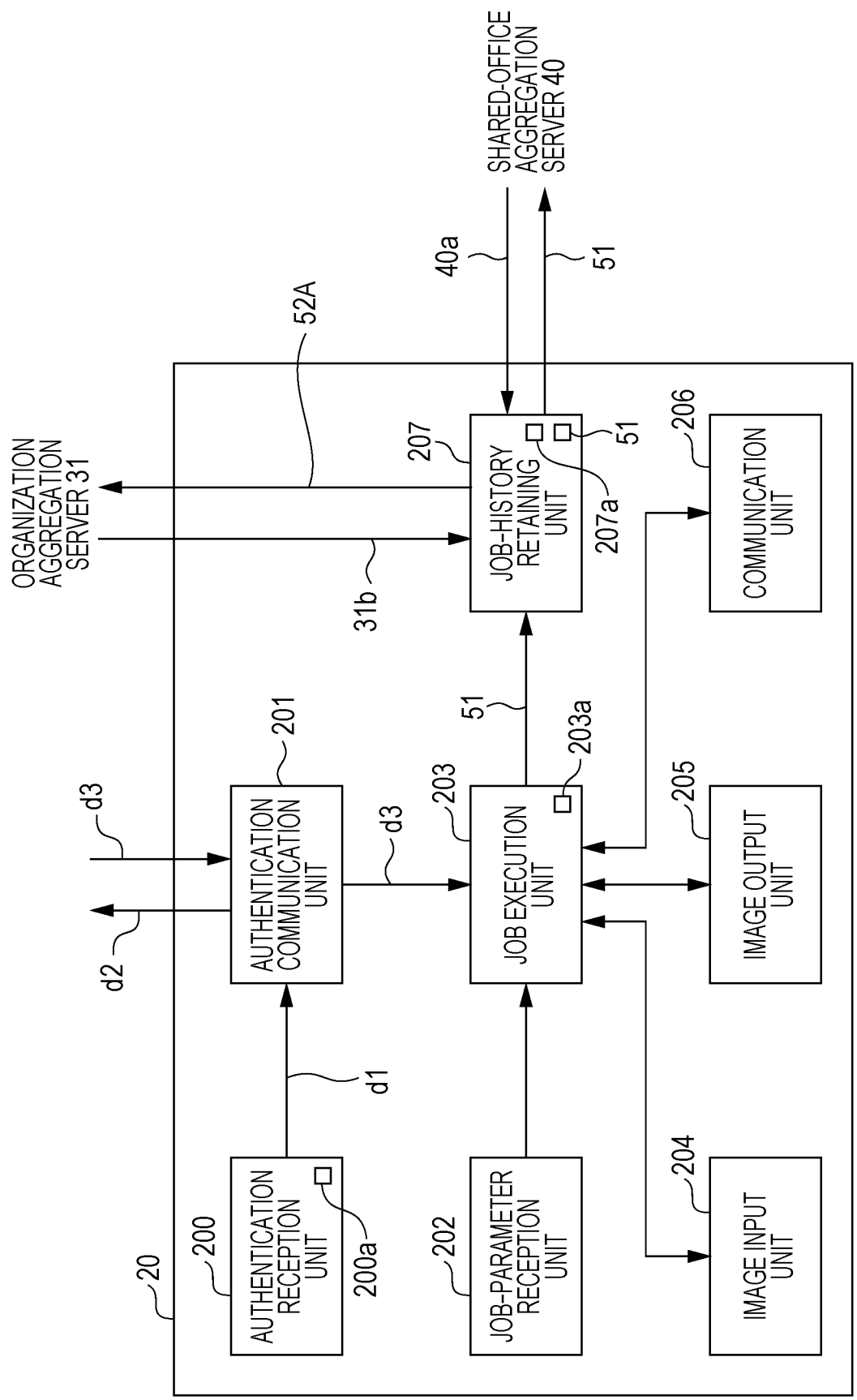
FIG. 2 is a block diagram illustrating an example of the configuration of each apparatus.

FIG. 2 is a block diagram illustrating an example of the configuration of each apparatus 20. The apparatus 20 includes an authentication reception unit 200, an authentication communication unit 201, a job-parameter reception unit 202, a job execution unit 203, an image input unit 204, an image output unit 205, a communication unit 206, and a job-history retaining unit 207. The authentication reception unit 200 and the job-parameter reception unit 202 are an example of a reception unit. The job execution unit 203 and the job-history retaining unit 207 are an example of a presenting unit.

The units 200 to 207 constituting the apparatus 20 may entirely or partially be realized by a central processing unit (CPU) operating in accordance with a program stored in a storage unit (not shown).

The authentication reception unit 200 receives authentication information (e.g., an organization ID, a user ID, and a password) from a user of the apparatus 20. The authentication reception unit 200 has an authentication server list 200a (see FIG. 3) stored in a storage unit (not shown). The storage unit is constituted of, for example, a read-only memory (ROM), a random access memory (RAM), or a hard disk drive. The authentication reception unit 200 may be realized by, for example, a card reader. The card reader reads, for example, the organization ID, the user ID, and the password from a card owned by the user. The user ID is an example of user identification information.

Furthermore, the authentication reception unit 200 acquires an address (e.g., an IP address) of the corresponding authentication server 30 from the organization ID contained in the authentication information received from the user by referring to the authentication server list 200a, and generates address-attached authentication information d1 containing, for example, the user ID, the password, and the IP address. The authentication reception unit 200 outputs the address-attached authentication information d1 to the authentication communication unit 201.

When the authentication communication unit 201 receives the address-attached authentication information d1 from the authentication reception unit 200, the authentication communication unit 201 transmits authentication information d2 (e.g., the user ID and the password) to the authentication server 30 having the IP address contained in the address-attached authentication information d1. Furthermore, the authentication communication unit 201 receives an encryption-key-attached converted user ID (e.g., an encryption key and a converted user ID) d3 as a response to the authentication information d2 from the authentication server 30 and outputs the encryption-key-attached converted user ID d3 to the job execution unit 203.

The job-parameter reception unit 202 receives a job execution request containing a job parameter (such as the number of copies) from the user of the apparatus 20, and outputs the job to the job execution unit 203. The job-parameter reception unit 202 may be realized by, for example, a touchscreen display. The job execution request may alternatively be received from any one of the user terminals 21 via the communication unit 206.

The job execution unit 203 has an encryption-target item table 203a (see FIG. 4) stored in a storage unit (not shown). The storage unit is constituted of, for example, a read-only memory (ROM), a random access memory (RAM), or a hard disk drive. The job execution unit 203 receives the encryption-key-attached converted user ID d3 from the authentication communication unit 201 and receives a job from the job-parameter reception unit 202 or the communication unit 206. The job execution unit 203 generates a job ID, executes the job by controlling the image input unit 204, the image output unit 205, or the communication unit 206, and generates job history information 50 (see FIG. 5) as a job execution result. The job execution unit 203 generates encrypted job-history information 51 (see FIG. 6) by performing a concealing process on the job history information 50 for concealing information that should be concealed, and outputs the encrypted job-history information 51 to the job-history retaining unit 207.

The information that should be concealed includes information with which the contents of information to be handled by the user are presumable or recognizable, or information with which the user is uniquely presumable or recognizable and then identifiable.

1. For example, the information that should be concealed may be one of the following.

a. Information with which the contents of handled document data and the purpose thereof are presumable.

Conceivable examples include a file name of a printed document and a FAX number.

b. Information with which the user is identifiable.

Conceivable examples include a user ID at the time of log-in, the full name of the user, and an electronic mail address of the user.

2. The following information does not have to correspond to the information that should be concealed.

a. Information randomly generated by the apparatus 20.

A conceivable example includes a job ID.

b. Information not directly linked with the contents of handled document data and the purpose thereof.

Conceivable examples include the number of printed sheets (i.e., the same applies to the number of sheets read by a scanner), the size of printed sheets (i.e., the same applies to the size of sheets read by the scanner), and the type (e.g., copying, facsimile, printing, or scanning) of application program used (referred to as "application" hereinafter).

3. The following may be employed as the concealing process.

a. The concealing method includes deletion, masking, abstraction (i.e., replacement with other information (also referred to as concealment)), and encryption (i.e., the use of an encryption key and the use of an encryption program)

b. The information that should be concealed is partially or entirely included in the range of the concealing process.

In this exemplary embodiment, the job execution unit 203 refers to the encryption-target item table 203a (see FIG. 4) stored in the storage unit (not shown) and performs a concealing process that involves encrypting an item in accordance with an application to be used. In detail, the job execution unit 203 encrypts each user ID in the job history information 50 by using the encryption key received from the authentication communication unit 201 so as to generate the encrypted job-history information 51, and transmits the encrypted job-history information 51 to the job-history retaining unit 207. The encrypted job-history information 51 contains, for example, job IDs, user IDs (corresponding to converted user IDs in this case), applications, input sources, the number of input sheets, output destinations, and the number of output sheets.

The image input unit 204 includes, for example, a scanner and an automatic document feeder, and reads an image from a document placed on a document tray or from a document fed from the automatic document feeder.

The image output unit 205 outputs an image by forming the image on a recording medium, such as a sheet, by an electrophotographic or inkjet method.

The communication unit 206 performs mail exchange control and network-related control so as to exchange communication data via the internal network 22 and the external network 5. If the communication unit 206 receives a job from any one of the user terminals 21 via the internal network 22, the communication unit 206 delivers the job to the job execution unit 203 and exchanges information with an external apparatus by electronic mail or facsimile via the internal network 22 and the external network 5 under the control of the job execution unit 203.

The job-history retaining unit 207 has the encrypted job-history information 51 output from the job execution unit 203 and an aggregation password 207a received in advance from the owner of the shared offices 2 stored in a storage unit (not shown). The storage unit is constituted of, for example, a read-only memory (ROM), a random access memory (RAM), or a hard disk drive.

If the job-history retaining unit 207 receives a request for a job history list from the organization aggregation server 31, the job-history retaining unit 207 receives an encryption key list 31b from the organization aggregation server 31, acquires a hash value of an encryption key, and generates a converted-user-ID list. The job-history retaining unit 207 collects rows that match the converted-user-ID list from the encrypted job-history information 51, generates organization-job-history information 52, and transmits a reply. Due to the qualities of a hash function, it is not possible to generate a proper converted user ID unless the encryption key is correct. It is also not possible to inversely calculate an encryption key from a converted user ID.

If the job-history retaining unit 207 receives a request for a job history from the shared-office aggregation server 40, the job-history retaining unit 207 makes a request for transmission of an aggregation password 40a and determines the validity of the aggregation password 40a depending on whether or not the aggregation password 40a transmitted from the shared-office aggregation server 40 matches the aggregation password 207a retained in the job-history retaining unit 207. If the aggregation password 40a is valid, the job-history retaining unit 207 transmits the encrypted job-history information 51 with respect to all rows retained therein to the shared-office aggregation server 40.

Figure 3:
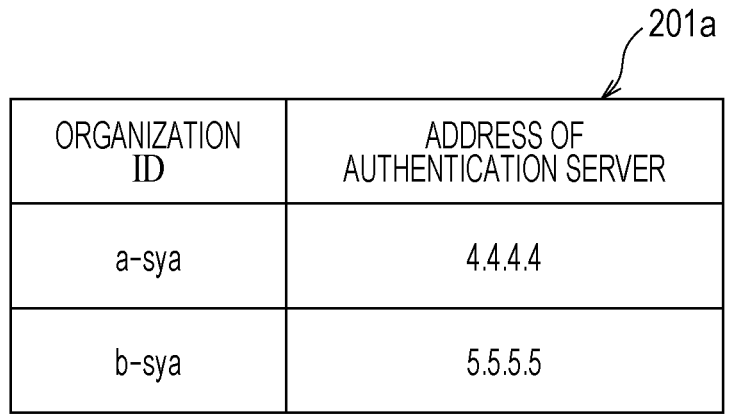
FIG. 3 illustrates an example of an authentication server list.

FIG. 3 illustrates an example of the authentication server list 200a. The authentication server list 200a is retained in the authentication reception unit 200. The authentication server list 200a has, for example, an organization ID item and an authentication server address item. An authentication server address includes an address (such as an IP address) of the authentication server 30 recorded in correspondence with an organization ID.

Figure 4:
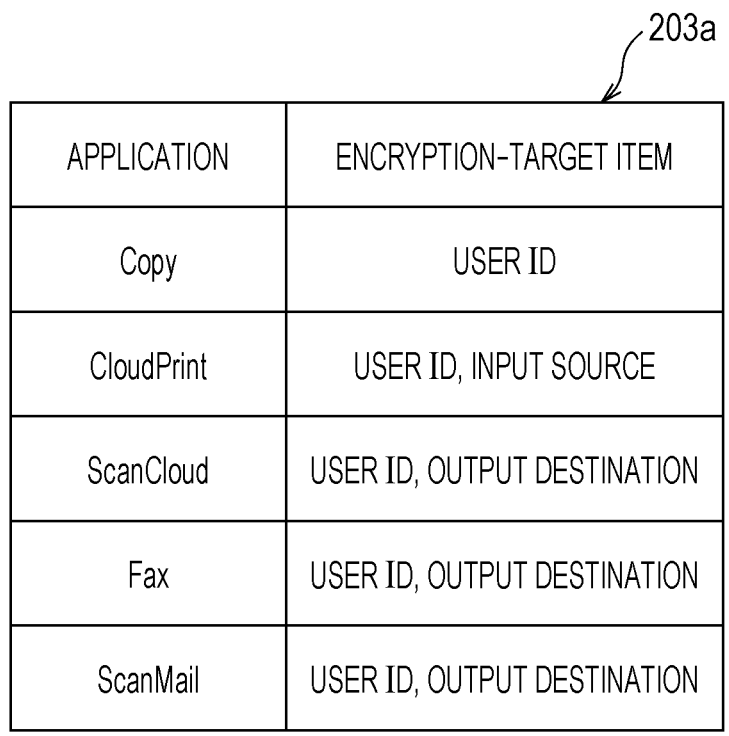
FIG. 4 illustrates an example of an encryption-target item table.

FIG. 4 illustrates an example of the encryption-target item table 203a. The encryption-target item table 203a is retained in the job execution unit 203. The encryption-target item table 203a has, for example, an application item and an encryption-target item. The application item indicates applications and has application names recorded therein, such as Copy, CloudPrint, ScanCloud, Fax, and ScanMail. The encryption-target item has recorded therein items to be encrypted. It is assumed that applications, such as Copy, CloudPrint, ScanCloud, Fax, and ScanMail, are installed in the apparatus 20. The applications are functions for executing specific processes and are not limited to the aforementioned applications.

The Copy application involves causing the image input unit 204 to convert a document into an image in response to an operation directly performed on the apparatus 20, and subsequently causing the image output unit 205 to print and output the image onto a sheet. The CloudPrint application involves printing print data in the apparatus 20 via a cloud server. The ScanCloud application involves causing the image input unit 204 of the apparatus 20 to convert a document into an image and subsequently saving the image in a cloud server. The Fax application involves performing facsimile transmission of transmission data transmitted from any one of the user terminals 21 or an image converted by the image input unit 204. The ScanMail application involves performing electronic mail transmission of an image converted by the image input unit 204.

Figure 5:
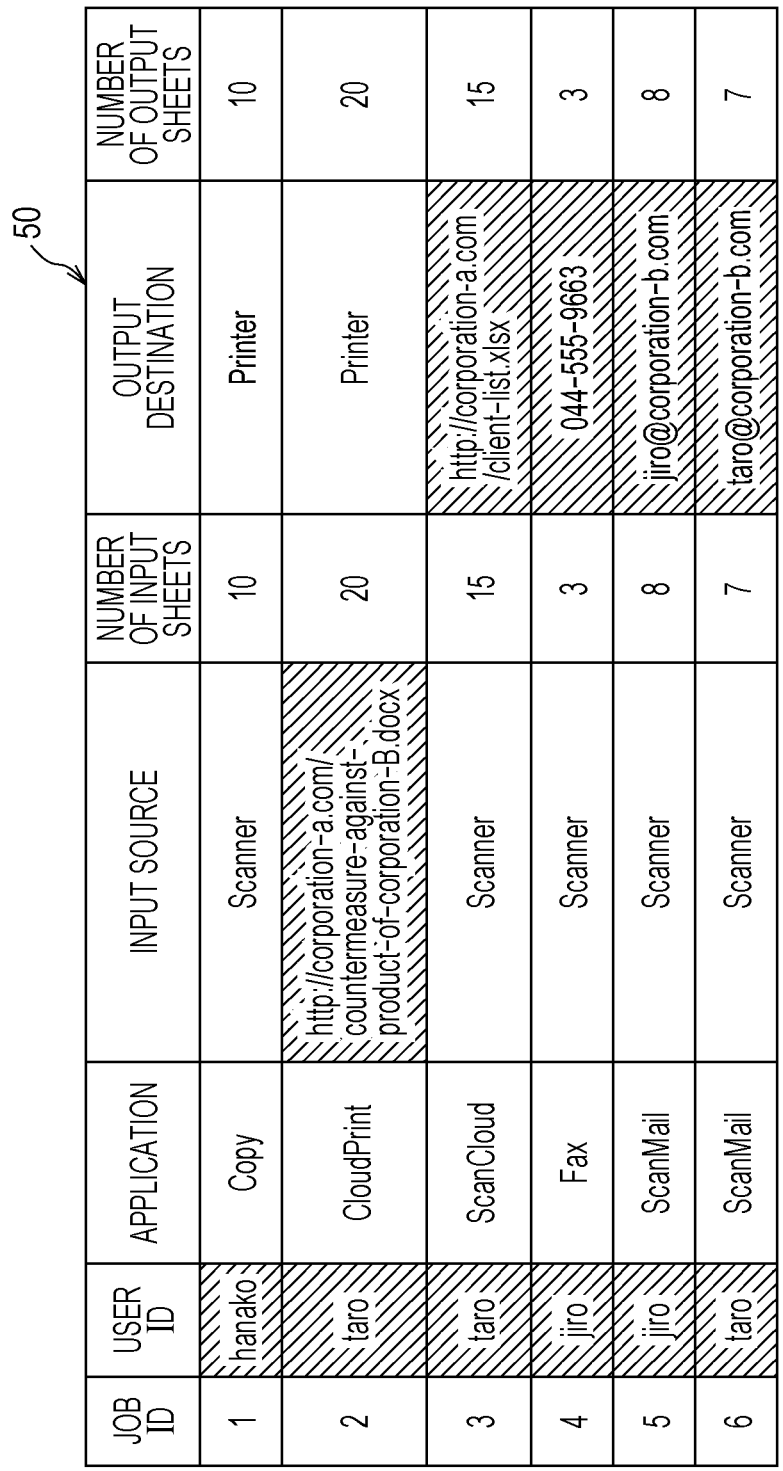
FIG. 5 illustrates an example of job history information before being encrypted.

FIG. 5 illustrates an example of the job history information 50 before being encrypted. The job history information 50 before being encrypted has, for example, a job ID item, a user ID item, an application item, an input source item, a number-of-input-sheets item, an output destination item, and a number-of-output-sheets item. In the job ID item, a job ID given to a job is recorded. In the user ID item, a user ID of the user who has commanded the job is recorded. In the application item, an application name is recorded. In the input source item, positional information of a process target of an application is recorded. In the number-of-input-sheets item, the number of sheets of the process target of the application is recorded. In the output destination item, information about the output destination of a process result obtained by the application is recorded. In the number-of-output-sheets item, the number of sheets of the process result obtained by the application is recorded. In the input source item and the output destination item, for example, a URL, a telephone number, or an electronic mail address is recorded depending on the application.

In the job history information 50 that is not encrypted yet, it is apparent from job ID 2 and job ID 3 that "taro" belongs to the organization A. It is apparent from job ID 5 that "Jiro" belongs to the organization B. It is apparent from job ID 6 that there is another person named "taro" in the organization B. Therefore, when the apparatus 20 is incorporated into a shared office environment and the job history is shared, the following problems may occur.

i. It is not possible to distinguish users having identical names and belonging to different organizations.

ii. The owner of the shared offices 2 is able to view information about a client organization, which should be concealed.

FIG. 6 illustrates an example of the encrypted job-history information 51 after being encrypted. The encrypted job-history information 51 has items similar to those before being encrypted. The user IDs are all encrypted regardless of the types of processes executed by the applications used. Furthermore, the encryption method is varied for every log-in process so that, even if user IDs are identical, the encrypted results are prevented from being the same. As illustrated in the encryption-target item table 203a shown in FIG. 4, the application with the application name "Cloud-Print" has its input source encrypted, and the applications with the application names "ScanCloud", "Fax", and "Scan-Mail" have their output destinations encrypted.

In FIG. 5, hatched cells indicate cells having recorded therein information that should be concealed. In FIG. 6, each hatched cell indicates an encrypted character string. It is apparent from each of the columns of the input source item and the output destination item that the information that should be concealed has been encrypted. Moreover, it is apparent from the column of the user ID item that, even when the same person logs in again, the encrypted user ID is changed. The encrypted job-history information 51 shown in FIG. 6 is acquired by the shared-office aggregation server 40 and is viewable by the owner operating the owner terminal 41. In other words, the owner is allowed to view the job history information of the apparatus 20 used by the users belonging to the respective organizations. However, because the information that should be concealed is concealed, the owner is not allowed to view the information prior to being concealed.

Because "taro" belonging to the organization A and "taro" belonging to the organization B are not distinguishable from each other in the apparatus 20 simply by viewing the user IDs, if the job history information 50 shown in FIG. 5 is simply aggregated, the following problems may occur.

i. The organization A tries to check the usage statuses of the members belonging to the organization A, but information about "taro" belonging to the organization B is undesirably mixed in the information about the members belonging to the organization A.

ii. Although each hatched cell has information that should be concealed, the following becomes apparent when focusing on this information.

It is apparent from the file name indicated as the input source of job ID 2 that the organization A may possibly pose a business threat to the organization B. Moreover, it is apparent from the file name of job ID 3 that "taro" is in a position and has a role to handle a client list.

Configuration of Authentication Server

The authentication server 30 receives the authentication information d2 (e.g., a user ID and a password) from the authentication communication unit 201 and performs an authentication process by verifying the user ID and the password. If the verification is successful, the authentication server 30 generates a random number and sets the random number as an encryption key. The authentication server 30 acquires a hash value of the encryption key and sets the hash value as a converted user ID. For example, the authentication server 30 transmits the encryption-key-attached converted user ID d3 containing the encryption key and the converted user ID to the authentication communication unit 201. For example, the authentication server 30 generates log-in information d4 containing the address (e.g., the IP address) of the apparatus 20 communicating therewith, the generated encryption key, and the user ID, and transmits the log-in information d4 (e.g., the IP address, the encryption key, and the user ID) to the organization aggregation server 31.

Configuration of Organization Aggregation Server

The organization aggregation server 31 includes a storage unit (not shown) that stores an aggregation table 31a (see FIGS. 7A and 7B) and the encryption key list 31b (see FIG. 8). The storage unit is constituted of, for example, a read-only memory (ROM), a random access memory (RAM), or a hard disk drive. When the organization aggregation server 31 receives the log-in information d4 (e.g., the IP address, the encryption key, and the user ID) from the authentication server 30, the organization aggregation server 31 records the log-in information d4 in the aggregation table 31a. The organization aggregation server 31 generates the encryption key list 31b of encryption keys contained in the received log-in information d4 and stores the encryption key list 31b in the storage unit.

The organization aggregation server 31 transmits, to the job-history retaining unit 207 of the apparatus 20, the encryption key list 31b related to a job history to be acquired. When the organization aggregation server 31 receives organization-job-history information 52A or 52B (see FIG. 9), the organization aggregation server 31 stores the organization-job-history information 52A or 52B in the storage unit. The organization aggregation server 31 decrypts the encrypted information that should be concealed in the organization-job-history information 52A or 52B, and subsequently writes the decrypted information in the aggregation table 31a.

FIG. 7A illustrates an example of the aggregation table 31a. The aggregation table 31a has, for example, an apparatus address item, an encryption key item, a job ID item, a user ID item, an application item, an input source item, a number-of-input-sheets item, an output destination item, and a number-of-output-sheets item. The first row has recorded therein the acquired log-in information d4 and the acquired organization-job-history information 52A or 52B, and the second row has recorded therein log-in information but is waiting for transmission of the organization-job-history information 52A or 52B. Each user ID is decrypted using an encryption key and is recorded in the aggregation table 31a.

In the case of the aggregation table 31a shown in FIG. 7A, the encryption key list 31b includes one encryption key "cjnaklhyuejn" in the second row that has not acquired the organization-job-history information 52A or 52B.

FIG. 7B illustrates an example of the aggregation table 31a having more recorded contents than the aggregation table 31a shown in FIG. 7A. Since FIG. 7B has two rows with the same encryption key, it is apparent that "taro" has commanded execution of two jobs in a single log-in period.

FIG. 8 illustrates an example of the encryption key list 31b. The encryption key list 31b has, for example, an encryption key item, a job ID item, and a user ID item. The encryption key list 31b may be created from the encryption keys, the job IDs, and the user IDs in the aggregation table 31a in FIG. 7B.

Configuration of Shared-Office Aggregation Server

The shared-office aggregation server 40 has the aggregation password 40a stored in a storage unit (not shown). The storage unit is constituted of, for example, a read-only memory (ROM), a random access memory (RAM), or a hard disk drive. The shared-office aggregation server 40 transmits the aggregation password 40a to the job-history retaining unit 207 and stores the encrypted job-history information 51 transmitted from the job-history retaining unit 207 into the storage unit. If there is a viewing request from the owner terminal 41, the shared-office aggregation server 40 transmits the encrypted job-history information 51 to the owner terminal 41.

Operation According to First Exemplary Embodiment

Figure 10:
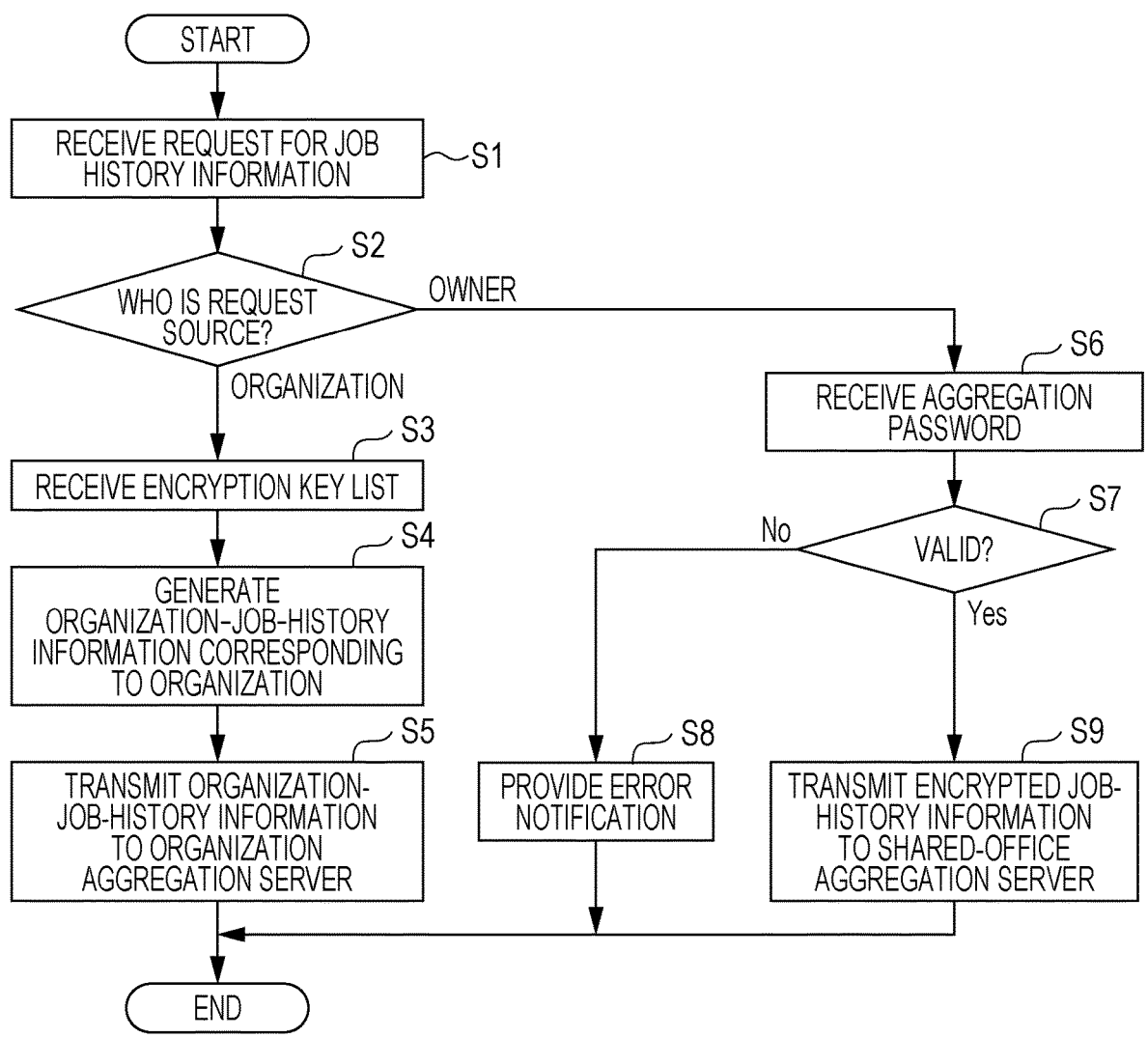
FIG. 10 is a flowchart illustrating an example of the operation of the apparatus.

Next, an example of the operation of the information processing system 1 will be described with reference to FIGS. 9 and 10. FIG. 10 is a flowchart illustrating an example of the operation of the apparatus 20.

When the job-history retaining unit 207 of the apparatus 20 receives a request for job history information in step S1, the job-history retaining unit 207 determines in step S2 whether the request source is the organization aggregation server 31 of an organization or the shared-office aggregation server 40 of the owner from, for example, the IP address.

If the request source is the organization aggregation server 31 of an organization (i.e., the organization A in this case), the encryption key list 31b is received from the organization aggregation server 31 in step S3.

Subsequently, in step S4, the job-history retaining unit 207 generates organization-job-history information 52A corresponding to the organization A based on the encryption key list 31b.

In step S5, the job-history retaining unit 207 transmits the organization-job-history information 52A to the organization aggregation server 31 of the organization A. The administrator may access the organization aggregation server 31 from the administrator terminal 32 via the internal network 33 so as to view the organization-job-history information 52A.

FIG. 9 illustrates an example of the organization-job-history information 52A that may be viewed from the administrator terminal 32 of the organization A. In the organization-job-history information 52A, each of the cross-hatched cells of job IDs 4 to 6 is masked since the user Pb belongs to another organization B. In FIG. 9, the hatched cells of job IDs 2 and 3 include information that should be concealed but have been decrypted using an encryption key for the organization A known by the administrator. Accordingly, information that should be concealed of organizations other than the own organization is not viewable. The cross-hatched cells indicate data not viewable by the administrator of the organization A.

If the request source is the shared-office aggregation server 40 in step S2 described above, the job-history retaining unit 207 makes a request to the shared-office aggregation server 40 and receives the aggregation password 40a in step S6.

In step S7, the job-history retaining unit 207 determines the validity of the aggregation password 40a depending on whether or not the aggregation password 40a transmitted from the shared-office aggregation server 40 matches the aggregation password 207a retained in the job-history retaining unit 207. If the aggregation password 40a is not valid (No in step S7), the job-history retaining unit 207 provides an error notification to the shared-office aggregation server 40 in step S8.

If the aggregation password 40a is valid (Yes in step S7), the job-history retaining unit 207 transmits the encrypted job-history information 51 with respect to all rows retained therein to the shared-office aggregation server 40 in step S9. The owner may access the shared-office aggregation server 40 from the owner terminal 41 via the internal network 42 so as to view the encrypted job-history information 51.

First Modification

In a first modification, the owner is able to distinguish between organizations. Although the owner of the shared offices 2 should not be allowed to identify a user or to track the usage status of a specific user, the owner may be allowed to track the usage status of a larger unit, such as an organization. For example, when the owner of the shared offices 2 is to optimize a service, the owner may perform the optimization in line with the intention of an organization that frequently uses the shared offices 2.

A concealment organization ID is set between the organization and the owner, and is set in the authentication server 30 and the organization aggregation server 31. For example, a random character string is set instead of a character string linked with the organization, such as "Corporation-A". The reason for not using an organization ID is because a multifunction apparatus has a function of a job history screen on which the job history of another organization is checkable. The reason for keeping the function of the job history screen without deleting it is because, when the operation of the multifunction apparatus is slow or undergoes a trouble, information for a solution is provided to a user on the scene. The concealment organization ID is an example of organization identification information.

When an authentication process is to be performed, the authentication server 30 adds a concealment organization ID behind a converted user ID so as to generate a new converted user ID. For example, if the converted user ID is "fdjak" and the concealment organization ID is "DFG", "fdjakDFG" is the new converted user ID and is transmitted to the apparatus 20. The new converted user ID is an example of extended identification information.

When an aggregation process is to be performed, the organization aggregation server 31 transmits the concealment organization ID in addition to the encryption key list to the job-history retaining unit 207.

The job-history retaining unit 207 adds the concealment organization ID to the hash value of the encryption key and uses the concealment organization ID to search for matching job history information. The job-history retaining unit 207 then returns the found job history information as the organization-job-history information 52A or 52B to the organization aggregation server 31.

Second Modification

In a second modification, the encryption method is flexible. Although the owner of the shared offices 2 should not be allowed to view information containing personal information, the owner may be allowed to acquire general information about a communication destination of the apparatus 20 so long as the information does not uniquely specify the communication destination. Although this depends on the contract with a client organization, for example, the country code and the area code of the telephone number may be disclosed so that, when the owner of the shared offices 2 optimizes a service, the owner may find that, for example, "there is frequent FAX transmission with India" and may enhance the line with a specific country.

The authentication server 30 transmits not only an encryption key but also a concealing program for concealing specific characters to the apparatus 20.

The job execution unit 203 executes the concealing program transmitted from the authentication server 30. The job execution unit 203 transmits, to the job-history retaining unit 207, the following three connected character strings.

a. A character string in which a part of information to be concealed is replaced with "*" in accordance with a program.

b. A character string whose information is entirely encrypted.

c. The number of characters in the character string whose information is entirely encrypted.

Accordingly, a fixed length is obtained by padding zero.

When an administrator of an organization is to acquire job history information, the administrator first obtains the number of characters (c) and then extracts and decrypts the part (b).

Figure 11:
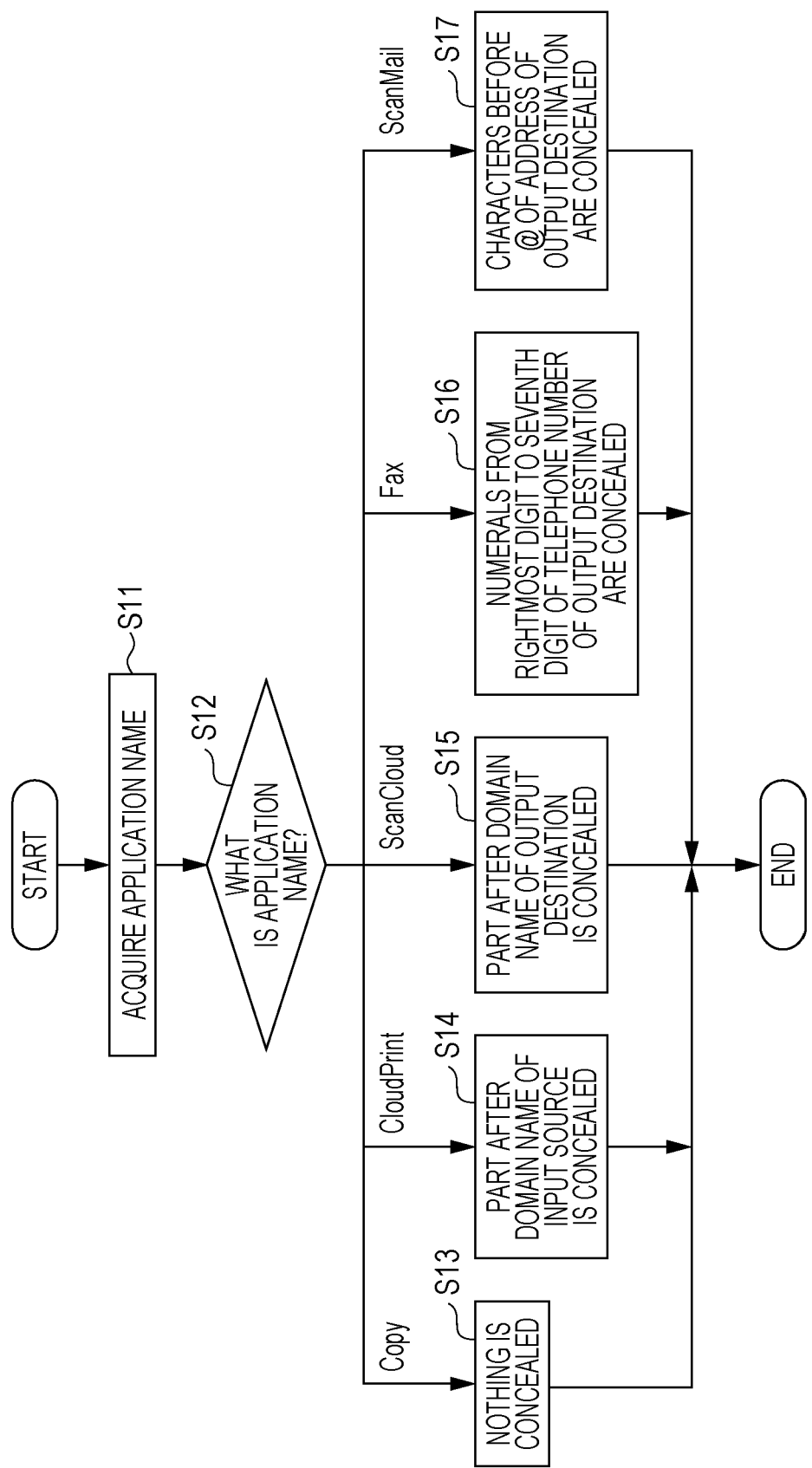
FIG. 11 is a flowchart illustrating an example of the operation of a concealing program.

FIG. 11 is a flowchart illustrating an example of the operation of the concealing program.

In step S11, the job execution unit 203 acquires an application name to be used from a job. Then, in step S12, the job execution unit 203 determines which of the applications in the encryption-target item table 203a shown in FIG. 4 the acquired application name corresponds to.

In the case of "Copy", nothing is concealed in step S13, and the process ends. In the case of "CloudPrint", the part after the server name of the input source is concealed in step S14, and the process ends. In the case of "ScanCloud", the part after the server name of the output destination is concealed in step S15, and the process ends. In the case of "Fax", numerals from the rightmost digit to the seventh digit of the telephone number of the output destination are concealed in step S16, and the process ends. In the case of "ScanMail", the characters before the symbol "@" of the address of the output destination are concealed in step S17, and the process ends.

Figures 12, 13:
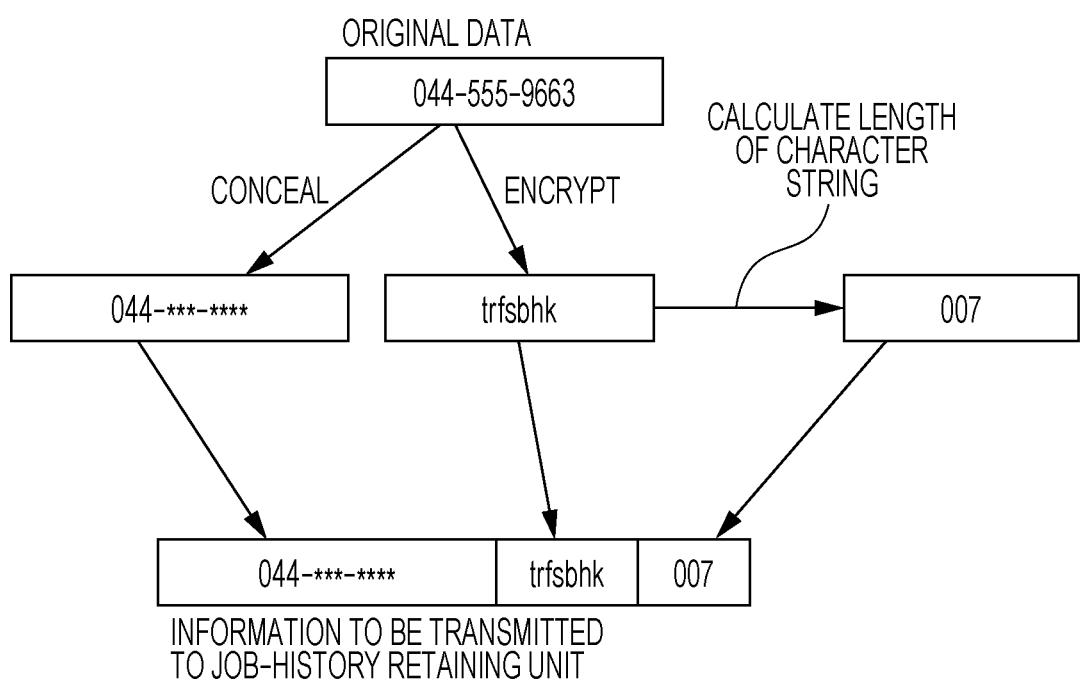
FIG. 12 illustrates an example of information before and after a concealing process.
FIG. 13 illustrates an example of information transmitted to a job-history retaining unit.

FIG. 12 illustrates an example of information before and after the concealing process. If the input source or the output destination is expressed using a URL, the file name in the latter half of the URL is concealed. In this case, information containing a title name that indicates the contents of a file is concealed.

FIG. 13 illustrates an example of information transmitted to the job-history retaining unit 207. As shown in FIG. 13, only the part to be desirably concealed may be encrypted and decrypted. A method described here is simple during a decryption process. For example, when the decryption process is to be performed, it is not necessary to find an encrypted character string based on a complicated procedure.

Third Modification

A third modification is made to cope with small-scale organizations. Although this exemplary embodiment is basically directed to large-scale corporate clients, another notable aspect of shared offices 2 is to "provide low-cost offices to venture corporations and startup corporations". Because these clients have a small number of people and thus desire to reduce costs as much as possible, there is a high possibility that they consider establishing their own authentication server to be a load. An alternative solution is provided to these clients.

Figure 14:
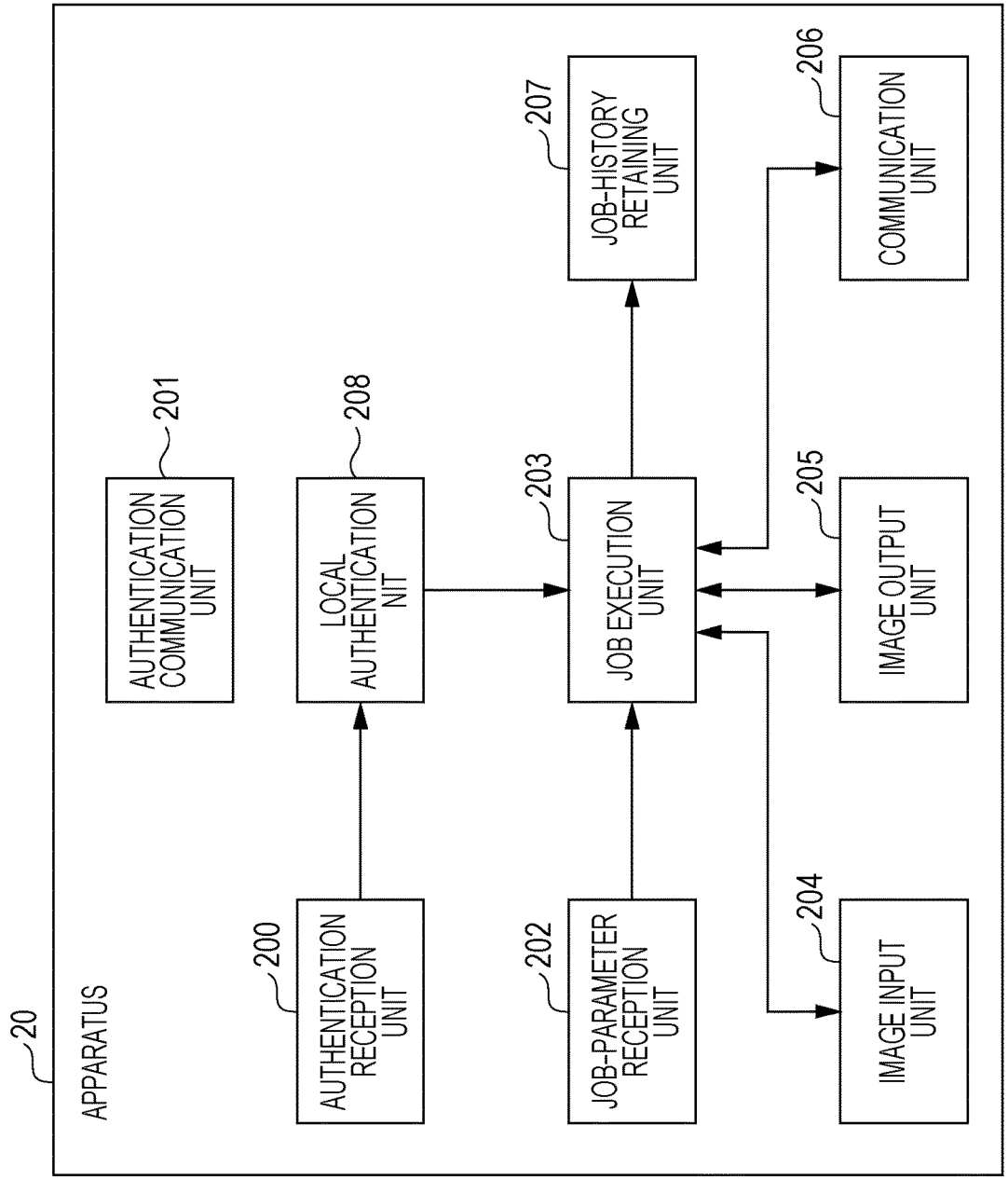
FIG. 14 is a block diagram illustrating an example of the configuration of an apparatus according to a third modification.

FIG. 14 is a block diagram illustrating an example of the configuration of an apparatus 20 according to the third modification. Similar to the first exemplary embodiment, the apparatus 20 includes an authentication reception unit 200, an authentication communication unit 201, a job-parameter reception unit 202, a job execution unit 203, an image input unit 204, an image output unit 205, a communication unit 206, and a job-history retaining unit 207, and further includes a local authentication unit 208.

The local authentication unit 208 retains authentication information, such as a user ID and a password, in an internal memory. Although an authentication server is necessary when authentication information is to be shared between two or more multifunction apparatuses, an authentication server is omitted, assuming that "local authentication" is used. Moreover, since the organization has a small number of people, an aggregation server is omitted, assuming that the administrator of the organization does not demand an aggregation.

When a user belonging to the small-group organization performs a log-in process, the user uses the local authentication unit 208 instead of the authentication communication unit 201. The authentication communication unit 201 and the local authentication unit 208 are switched in accordance with whether or not an organization ID is input during the log-in process. If there is an organization ID, the authentication communication unit 201 is used. If there is no organization ID, the local authentication unit 208 is used. Although the local authentication unit 208 performs operation equivalent to that of an authentication server, the difference is that the generated encryption key after being transmitted to an encryption unit is forgotten without being saved.

Although information encrypted by the job execution unit 203 is not decryptable, there is no problem since the administrator of the organization has no demand for an aggregation (i.e., decryption).

Fourth Modification

In a fourth modification, a user is allowed to view job history information, similarly to an administrator of an organization.

When job history information is requested together with an organization ID by accessing the organization aggregation server 31 from any one of the user terminals 21, the organization aggregation server 31 presents the organization-job-history information 52 corresponding to the organization ID to the user terminal 21. The user terminal 21 is not able to download organization-job-history information, but is able to present the organization-job-history information for viewing. Although information about previously executed job is encrypted, the information is understandable to a certain extent.

Alternatively, a user may be given authorization to view his/her own history information only without concealment or may be given authorization to view information other than the information that should be concealed in the history information related to users belonging to his/her organization, and the history information may be concealed in accordance with the authorization and be presented to the user.

Although the exemplary embodiment of the present disclosure has been described above, the exemplary embodiment of the present disclosure is not limited to the exemplary embodiment described above, and various modifications are permissible within the scope of the disclosure.

Each of the units constituting the controller may be partially or entirely be constituted of a hardware circuit, such as a field-programmable gate array (FPGA) or an application specific integrated circuit (ASIC).

Furthermore, one or some of the components in the exemplary embodiment described above may be omitted or changed within the scope of the disclosure.

Furthermore, in the flowchart in the above-described exemplary embodiment, for example, a step or steps may be added, deleted, changed, or interchanged within the scope of the disclosure. Moreover, the program used in the above-described exemplary embodiment may be provided by being recorded on a computer readable recording medium, such as a compact disc read-only memory (CD-ROM). Alternatively, the program used in the above-described exemplary embodiment may be stored in an external server, such as a cloud server, and may be used via a network.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor programmed to
acquire identification information used for identifying a user and receive a request for executing a job with respect to an apparatus to be used;
generate instructions to execute the job by using a function included in the apparatus and generate history information using the identification information and an execution result of the job; and
entirely or partially conceal the history information in accordance with authorization of a viewer and generate instructions to present the concealed history information,
wherein the processor is programmed to include different ranges for concealment depending on whether or not the viewer and the user belong to the same organization, and
wherein if the viewer is a first administrator related to an organization to which the user belongs, the processor is programmed to partially conceal the history information related to a user belonging to the organization and present the partially-concealed history information, and entirely conceal the history information related to a user belonging to another organization and present the entirely-concealed history information,
wherein the partially-concealed history information and the entirely-concealed history information are included in the history information.

2. The information processing apparatus according to claim 1,
wherein the processor conceals an item in accordance with the function.

3. The information processing apparatus according to claim 2,
wherein the processor performs the concealment by using an encryption key that varies for every user authentication.

4. The information processing apparatus according to claim 3,
wherein the encryption key is generated by performing an authentication process on the identification information during authentication of the user.

5. The information processing apparatus according to claim 4,
wherein the authentication process is performed by an external authentication apparatus that is managed by an organization to which the user belongs and that performs the authentication process on the identification information.

6. The information processing apparatus according to claim 4,
wherein the authentication unit process is included in the information processing performed by the processor.

7. The information processing apparatus according to claim 2,
wherein the processor partially conceals an item in accordance with the function by using a program.

8. The information processing apparatus according to claim 1,
wherein if a request for history information is received from an external apparatus managed by the first administrator, the processor acquires an encryption key list from the external apparatus and presents, to the external apparatus, history information obtained by partially decrypting the history information concealed with respect to the user belonging to the organization, the partially-decrypted history information being included in the history information and being partially decrypted by using an encryption key included in the acquired encryption key list.

9. The information processing apparatus according to claim 8,
wherein the processor generates instructions to present, to the external apparatus managed by the second administrator, history information expressing the identification information with extended identification information, the extended identification information being extended by adding identification information of the organization, from which a name of the organization is not identifiable, to encrypted identification information, the encrypted identification information being obtained by encrypting the identification information with the encryption key.

10. An information processing apparatus comprising:
a processor programmed to acquire identification information used for identifying a user and receive a request for executing a job with respect to an apparatus to be used;
generate instructions to execute the job by using a function included in the apparatus and generate history information using the identification information and an execution result of the job; and
entirely or partially conceal the history information in accordance with authorization of a viewer and generate instructions to present the concealed history information, wherein the processor is programmed to include different ranges for concealment depending on whether or not the viewer and the user belong to the same organization, and
wherein if the viewer does not belong to the same organization as the user and is a second administrator of an area in which the apparatus is disposed, the processor is programmed to partially conceal the history information related to all organizations and present the partially-concealed history information.

11. The information processing apparatus according to claim 10,
wherein the processor conceals an item in accordance with the function.

12. The information processing apparatus according to claim 10,
wherein if a password transmitted from an external apparatus managed by the second administrator matches a password retained in the information processing apparatus, the processor partially conceals the history information and presents the partially-concealed history information to the external apparatus.

13. An information processing system comprising:
an information processing apparatus including a first processor programmed to
acquire identification information used for identifying a user and receive a request for executing a job with respect to an apparatus to be used,
generate instructions to execute the job by using a function included in the apparatus and generate history information using the identification information and an execution result of the job, and entirely or partially conceal the history information in accordance with authorization of a viewer and generate instructions to present the concealed history information;

a first external apparatus that is managed by a first administrator related to an organization to which the user belongs and that includes a second processor programmed to receive, from the information processing apparatus, the partially-concealed history information with respect to a user belonging to the organization and the entirely-concealed history information with respect to a user belonging to another organization, the partially-concealed history information and the entirely-concealed history information being included in the history information; and a second external apparatus that is managed by a second administrator of an area in which the apparatus is disposed and that includes a third processor programmed to receive the partially-concealed history information related to all organizations from the information processing apparatus.

14. The information processing system according to claim 13, wherein if a request for viewing history information is received from a terminal used by the user belonging to the organization, the first external apparatus presents the history information to the terminal such that unconcealed history information is only viewable.

15. A non-transitory computer readable medium storing a program causing a computer to execute a process, the process comprising:

acquiring identification information used for identifying a user and receiving a request for executing a job with respect to an apparatus to be used;

executing the job by using a function included in the apparatus and generating history information using the identification information and an execution result of the job;

entirely or partially concealing the history information in accordance with authorization of a viewer and presenting the concealed history information;

including different ranges for concealment depending on whether or not the viewer and the user belong to the same organization; and if the viewer is a first administrator related to an organization to which the user belongs, partially concealing the history information related to a user belonging to the organization and presenting the partially-concealed history information, and entirely concealing the history information related to a user belonging to another organization and presenting the entirely-concealed history information, wherein the partially-concealed history information and the entirely-concealed history information are included in the history information.

* * * * *